Nov. 30, 1965    J. LITSIOS    3,220,166
MULTI-TUBE SONIC DEFOAMER
Filed Nov. 7, 1961    3 Sheets-Sheet 1

JOHN LITSIOS
INVENTOR.

BY S. A. Giarratana
George B. Axirott
ATTORNEYS

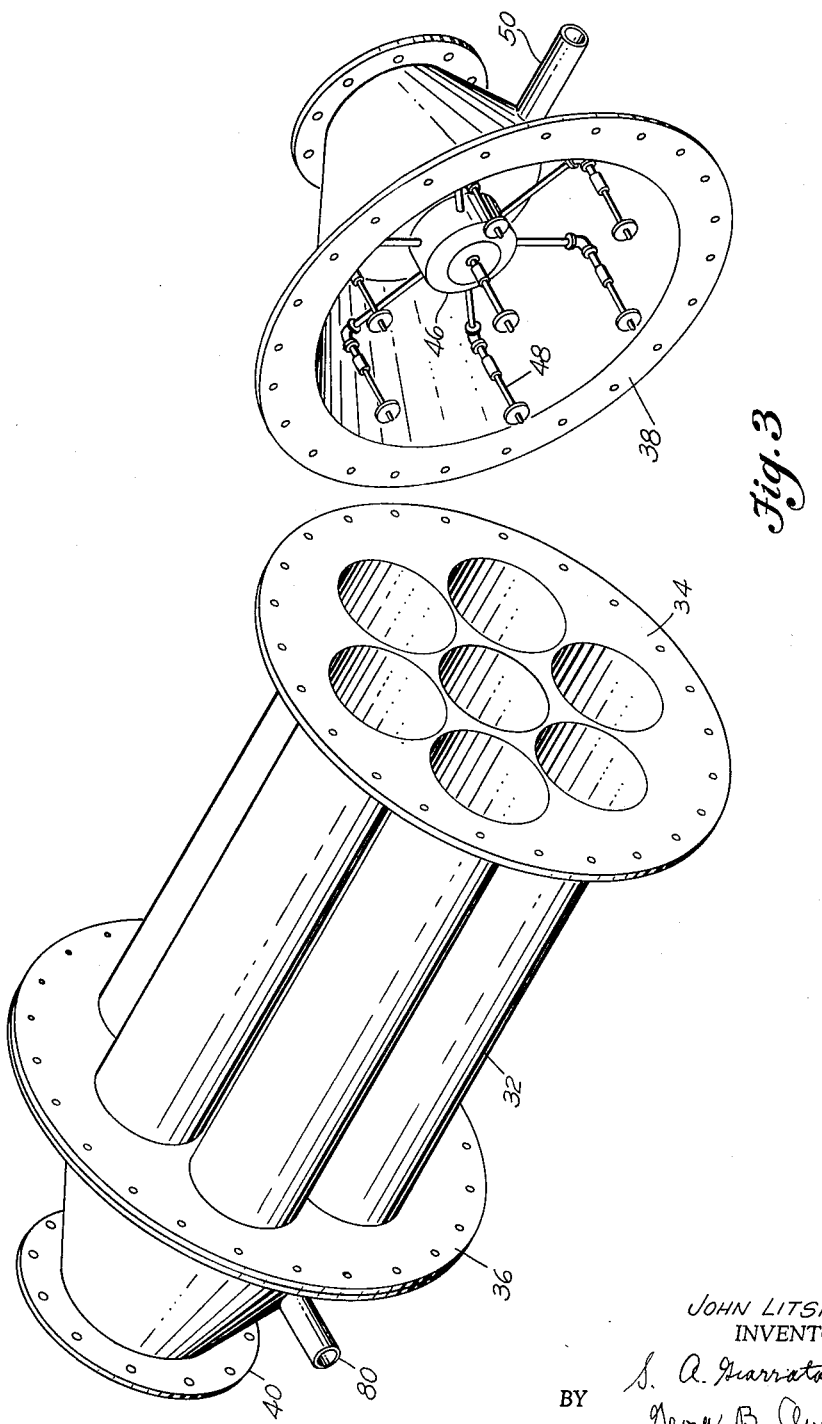

Nov. 30, 1965    J. LITSIOS    3,220,166
MULTI-TUBE SONIC DEFOAMER
Filed Nov. 7, 1961    3 Sheets-Sheet 3

JOHN LITSIOS
INVENTOR.

BY S. A. Giavatana
George B. Aujuoti
ATTORNEYS

United States Patent Office 3,220,166
Patented Nov. 30, 1965

3,220,166
MULTI-TUBE SONIC DEFOAMER
John Litsios, Tenafly, N.J., assignor to General Precision Inc., Little Falls, N.J., a corporation of Delaware
Filed Nov. 7, 1961, Ser. No. 150,821
1 Claim. (Cl. 55—178)

This invention relates to apparatus for destroying foam by sonic energy, and more particularly to sonic transducer and defoamer tube combinations for more effectively destroying foam.

There are many processes wherein a material undergoing treatment is stirred or aerated in a manner that creates an extensive amount of foaming which must be destroyed. Examples of this range all the way from processing liquid detergents to growing antibiotic cultures. In the latter case, different cultures, such as penicillin, are grown in liquid media and transferred from one fermenter to another as production increases. The broth is continually agitated and oxygen is fed into the fermenters through air sparge pipes at the base of the vessel. As the antibiotic culture multiplies the broth thickens, and given certain conditions, foam is produced within the mixture by the air pumped through it. This foaming takes place without warning and cannot be controlled in the raw product by varying the constituents, temperatures, or other production techniques. The vessels are therefore not fully utilized, as waste space must be provided above the liquid level to accommodate excess foaming conditions. Nor can the foaming be predicated. A batch may suddenly foam violently or may foam continuously at a slow rate or at rates somewhere between the two extremes.

It has been found that foam created in such processing applications can be destroyed by subjecting the foam surface to high intensity sonic energy. However, the surface area of most process vessels or tanks generally exceeds the effective operating area of sonic transducers which generate the sound waves that are air coupled to the foam surface. Attempts have been made to overcome this problem by dispersing the sonic transducers more widely over the surface to increase the radiating area, but it has been found that this merely reduces the intensity of the sonic energy below the level required to destroy the foam. This, in turn, was overcome by adding additional transducers to the top of the tank, either evenly spaced, or in clusters. The foam would then rise in the tank until it reached a level where the intensity of the sonic energy was high enough to break it down, and in this connection, it has been determined that an intensity in the order of 147 db or greater is required for effective defoaming to take place.

Although the operation of sonic transducers in close proximity to each other allows the treatment of a larger area of foam, the interaction between the output of each transducer causes a reduction in the defoaming output. Stated otherwise the total power output is significantly less than the sum of the power output of each individual transducer. Because of this, increasing the number of transducers does not provide a corresponding increase in the defoaming rate.

In accordance with the present invention, this interaction between transducers is eliminated by positioning each of the transducers in the end of a separate defoaming tube and introducing the foam into the opposite ends of the tubes so that it is destroyed by the high intensity sonic energy generated by the transducers. By isolating each of the transducers in a separate tube in this manner the total power output is significantly increased. In addition, it has been discovered that for a given transducer an optimum diameter defoaming tube exists for obtaining maximum defoaming action, and that tubes having diameters greater or less than this optimum diameter clearly destroy foam less efficiently. Still further, it was found that by inclining the defoaming tubes off of the vertical, the defoaming rate was increased as a result of the removal of the defoamed liquid in a uniform flow pattern along the lower side of the tubes, the newly generated foam flowing counter current to this stream and above it. The defoamed liquid is collected below the defoaming tubes and returned to the liquid generating the foam by means of a separate drain line so as to reduce the mixing of the defoamed liquid with the new foam being introduced into the tubes.

Accordingly, it is one object of the invention to destroy foam by sonic energy at an increased rate and in a more effective manner.

It is another object of the invention to destroy foam by a plurality of sonic transducers at a maximum defoaming rate by assembling each of the transducers in a separate defoaming tube to reduce interaction between the transducers.

It is a further object of the invention to increase the defoaming rate of the defoaming tubes described above by making the tubes a predetermined optimum cross sectional area with respect to the sonic transducer associated therewith.

It is a still further object of the invention to increase the defoaming rate of a transducer defoaming tube combination of the type described above by inclining the tube off of the vertical to establish uniform counter current flow paths of defoamed liquid and foam so as to minimize mixing thereof.

It is a still further object of the invention to utilize the sparging air normally introduced into a tank containing the liquid being processed to force foam on the surface of the material into the defoaming tubes described above so that the defoaming action can start shortly after the foam is generated, thus making possible the reduction of headroom in the tank that must be provided for accommodating foam build-up.

It is a still further object of the invention to provide a separate drainline for returning defoamed liquid to the processing tank to reduce the possibility of defoamed liquid being generated back into foam by interaction with the new foam entering the defoaming tubes.

It is a still further object of the invention to deliver foam to the defoaming tubes soon after it is generated by controlling the pressure in the tank above the liquid, and to utilize the existing headroom in the tank as a foam accumulator during temporary peak foam generating periods.

It is a still further object of the invention to change the defoaming capacity of defoaming tube and sonic transducer combinations as described above by adding or shutting down the separate defoaming tubes and their associated transducers without affecting the performance of other transducer tube combinations.

It is a still further object of the invention to provide a defoaming apparatus which is relatively simple and economical to manufacture, easily assembled in position on a tank to defoam the liquid therein, and effective and efficient in use.

Other objects and features of novelty of the present invention will be specifically pointed out or will otherwise become apparent when referring, for a better understanding of the invention, to the following description taken in conjunction with the accompanying drawings, wherein:

FIG. 3 is an enlarged view of the defoamer illustrated in FIG. 1 with the end bell on one end thereof removed to more clearly illustrate the sonic transducers supported therein;

Figure 1:
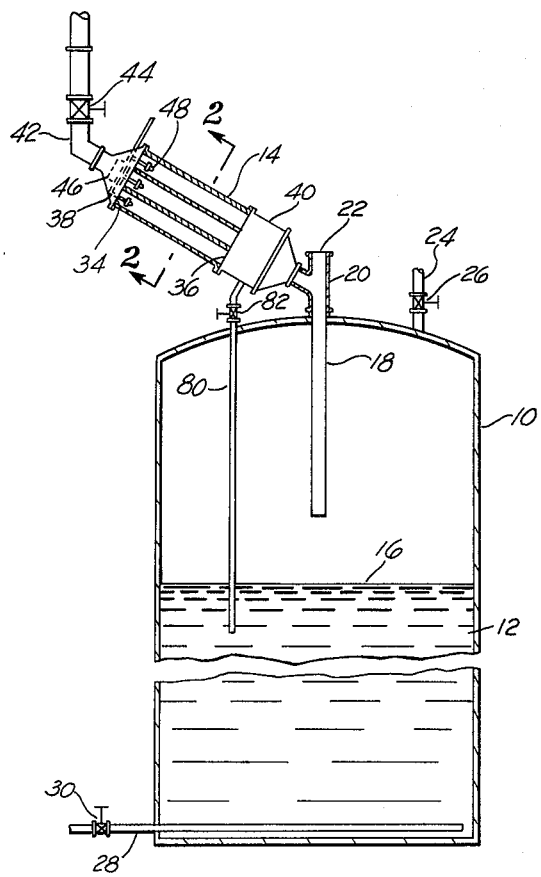
FIG. 1 is a sectional view in elevation of a defoamer embodying features of the invention mounted in position on a tank having a liquid therein that generates foam.

Referring to FIG. 1 a tank 10 is illustrated having a liquid 12 therein and a defoamer 14 embodying features of the invention mounted thereabove to destroy foam generated on the upper surface 16 of the liquid 12. A foam feed line 18 extends downwardly into the tank 10 with the lower end thereof positioned a predetermined distance above the upper surface 16 of the liquid and the upper end thereof connected to the defoamer 14 by a suitable Y connection 20 having a cover plate 22 closing off the vertical leg thereof. A vent line 24 having a control valve 26 is provided for venting the space within the tank 10 above the liquid, and a sparging line 28 having a control valve 30 projects into and extends along the bottom of the tank for introducing sparging air to agitate the liquid in a manner that causes foam to be generated on the upper surface 16 thereof.

Figure 2:
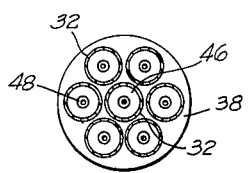
FIG. 2 is a sectional view taken on the line 2—2 of FIG. 1.

Referring to FIGS. 2 and 3 as well as FIG. 1, the defoamer 14 comprises a cluster of seven defoaming tubes 32 preferably made of thin walled stainless steel and secured in parallel side by side relation by spaced end flanges 34 and 36. A flanged end bell 38 is bolted to the flange 34 to enclose the upper end of the tubes 32 and a similar flanged end bell 40 is bolted to the flange 36 to enclose the lower ends of the tubes. A vent line 42 having a control valve 44 is connected to the end bell 38 and the end bell 40 is connected directly to the Y connection 20 so that the pressurized air can pass from the tank 10 up through the foam feed line 18, through the defoamer 14 and out through the vent line 42. This air-flow delivers foam to the defoamer as will be described in greater detail hereinafter. A manifold 46 is mounted within the end bell 38 and supports seven sonic transducers 48 with each of the transducers projecting into one of the defoaming tubes 32. The conduit 50 is mounted on the end bell 38 for delivering pressurized air to the manifold 46 which in turn distributes it to each of the transducers 48.

Figure 4:
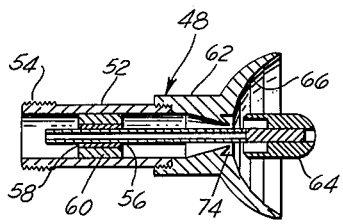
FIG. 4 is an enlarged longitudinal sectional view of one of the seven sonic transducers illustrated in FIG. 3.
Figure 5:
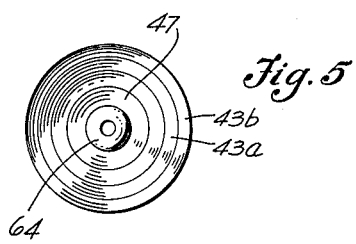
FIG. 5 is an end view of the transducer illustrated in FIG. 4.

Referring to FIG. 4, each of the sonic transducers 48 comprises a pipe 52 having an externally threaded end portion 54 adapted to be threadably connected to the piping which connects the transducers to the manifold as illustrated in FIG. 3. A stem 56 is supported on the axis of the pipe 52 by a bushing 58 having a plurality of radially extending circumferentially spaced flanges 60 thereon. The pipe 52 delivers the pressurized air to a nozzle 62 threadably connected on the right end of the pipe and the stem 56 projects through the nozzle in position to support a resonator 64 on the end thereof. Integral with the nozzle 62 is a shock wave radiator 66 constructed in a concave shape with its boundary cross section in the shape of a polygon.

In operation, the sparging air is introduced into the tank through the sparging line 28 under control of the valve 30, and the control valves 26 and 44 in the vent lines 24, 42, respectively are adjusted to control the rate at which this air leaves the tank, and thereby pressurize the interior of the tank above the upper surface 16 of the liquid. As soon as foam generated on the upper surface 16 of the liquid covers the end of the foam feed line 18, the pressure maintained above the liquid by the adjustment of the control valves 26 and 44 forces the foam up the feed line 18 at a controlled rate, through the Y connection 20 and into the defoaming tubes 32 where it is broken down by the high intensity sonic energy radiating from the sonic transducers 48. Since the defoaming tubes are inclined at an angle, the defoamed liquid drains down the defoaming tubes along the lower sides thereof and back into the end bell 40 from which it is delivered back to the tank 10 by a drain line 80 having a suitable control valve 82 therein. In this manner the defoamed liquid is collected below the defoaming tubes and returned to the liquid in the tank with the least amount of mixing with the new foam from the foam feed line 18.

This defoaming apparatus has the advantage of enabling the foam to be acted upon as soon as the entrance to the foam feed line 18 is covered by foam rather than requiring the level of the foam to rise close to the top of the tank where transducers can be located to destroy the foam. It also enables the headroom in the tank above the upper surface 16 of the liquid to be reduced, and to enable the remaining headroom to act as an accumulator to accommodate excess foam that may be generated in the event the rate of foam generation temporarily exceeds the defoaming rate. Each transducer 48 can produce a maximum defoaming without interacting with the other transducers in a manner that would reduce the combined defoaming rate of all the transducers. Further, by inclining the defoaming tubes to establish a uniform counter current flow path of foam and defoamed liquid, the defoaming rate of each transducer tube combination is increased, and by proper adjustment of the valves 44 and 26 the rate at which the foam is delivered to the defoaming tubes can be controlled to compensate for varying defoaming rates due to variation in the grades of foam or changes in sparging air volume.

In accordance with an important feature of the invention each of the defoaming tubes has a predetermined optimum across sectional area selected with respect to the transducer associated therewith to provide the maximum defoaming rate for each transducer and defoaming tube combination. With the stem jet whistle-type particular transducers which is marketed under the name "SoniJet" by the Kearfott Division of General Precision Equipment, Inc., a tube having a diameter of eight inches was found to provide the optimum cross sectional area. This is clearly demonstrated by the results of a number of tests which were conducted, the results of which are shown in Table I below:

TABLE I

*Defoaming rate vs. tube diameter*

[Tubes inclined 45° from vertical]

| Distance from Transducer | Defoaming Rate, ft.³/min. | | | |
| --- | --- | --- | --- | --- |
| | 7″ Dia. | 8″ Dia. | 9″ Dia. | 10″ Dia. |
| 12″ | 8.16 | 9.86 | 9.56 | 8.99 |
| 24″ | 7.25 | 8.70 | 7.81 | 6.67 |
| 36″ | 6.23 | 7.54 | 6.95 | 6.04 |

Additional tests were run to obtain data on the improvement provided by tilting the defoaming tubes at an angle off the vertical, and the results of these tests are shown in Table II below:

TABLE II

*Defoaming rate vs. angle of inclination off vertical*

[6¾″ dia. tube]

| Angle Off Vertical | Defoaming Rate, ft.³/min. | | |
| --- | --- | --- | --- |
| | 12″* | 24″ | 36″ |
| 0° | 6.95 | 6.37 | 5.22 |
| 30° | 8.10 | 6.22 | 6.09 |
| 45° | 8.25 | 7.25 | 6.22 |
| 60° | 8.40 | 6.22 | 5.80 |

*Distance of foam level to transducer.

In the embodiment described above the number of defoaming tubes 32 that are used can be varied and is based on the foam generation rate, and the rate of defoaming that is desired. Also, valves can be added at the entrance of each defoaming tube and on the air supply line to each transducer to reduce the number of tube and transducer combinations in operation during periods of low foam production. This can be done either manually or with remotely controlled valves. In the case of a blind installation, the sparing line 28 and the portions of the drain line 80 and the foam feed line 18 projecting into the tank can be eliminated. If the sparging line is eliminated, or it is not sufficient to provide the desired foam feed rate, additional pressurized air may be introduced into the space above the liquid. Suitable foam level detection probes also may be positioned in the defoaming tubes below the transducers and connected to the valves 26 and 44 to automatically control them to maintain proper foam flow to the defoaming tubes.

Figure 7:
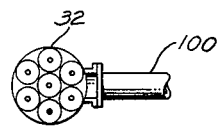
FIG. 7 is a plan view of the defoamer taken along the line 7—7 of FIG. 6.
Figure 6:
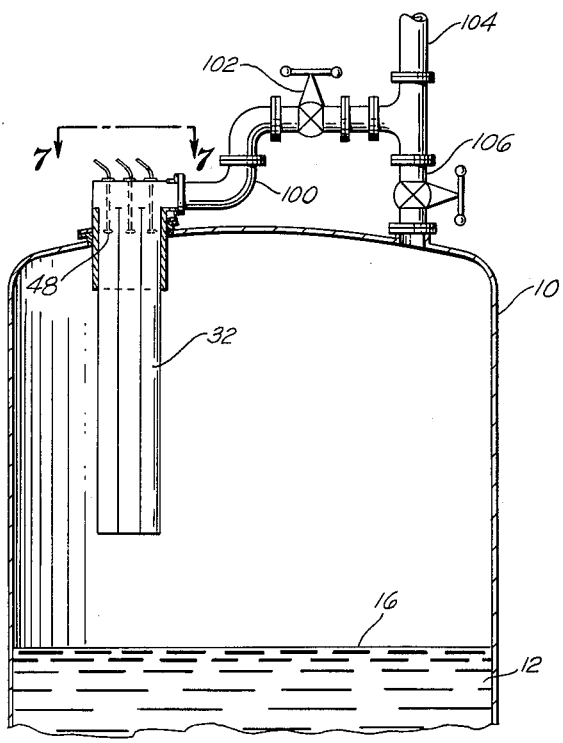
FIG. 6 is a partial elevational view shown partly in section, illustrating a modification of the invention.

Referring to FIGS. 6 and 7, another embodiment of the invention is illustrated which may be used in the event that sufficient headroom is not available above the tank 10 to permit the defoamer 14 to be installed thereabove. In this embodiment the defoaming tubes 32 are located within the tank with the transducers 48 mounted in the upper end thereof, and in this instance, individually connected to a suitable air supply. Suitable piping 100 having a control valve 102 therein connects the upper ends of the defoaming tubes 32 to a vent line 104 which is connected directly to the interior of the tank 10 through a control valve 106. The control valves 102 and 106 funtion in the same manner as the control valves 44 and 26 of FIG. 1 to control the rate at which the foam is delivered to the defoaming tubes. If desired the defoaming tubes may also be installed at an angle to take advantage of the increased defoaming rate of the tubes when inclined. Suitable foam level probes can likewise be installed in the tubes 32 of the embodiment illustrated in FIGS. 6 and 7 to automatically control the valves 102 and 106, and other foam level probes on the outside of the tubes can be connected to control the automatic addition of defoaming agents, if necessary, during periods of peak foam production.

It is to be observed that as used herein, the term "sonic" includes both audible and ultrasonic sounds. Furthermore, although the defoaming tubes are shown in the drawing as cylindrical, these tubes may be of other geometrical configurations.

While it will be apparent that the embodiments of the invention described above are well calculated to fulfill the objects of the invention, it will be appreciated that many changes, variations, and revisions may be made therein without departing from the spirit or scope of the invention as defined by the following claim.

What is claimed is:

In combination with a closed vessel for the containment of a body of liquid, a means for maintaining a liquid level having foam on the surface thereof in the vessel below the top thereof, said closed vessel having an inlet and sonic apparatus for the destruction of foam accumulating on said surface, comprising:
 a plurality of juxtaposed, open-ended defoaming tubes positioned above said vessel with their longitudinal axes inclined between horizontal and vertical;
 respective end bells forming chambers opened to the interior of the defoaming tubes at their upper and lower ends;
 individual stem jet whistle-type sonic transducer means in the upper ends of each of said defoaming tubes;
 conduit means placing the lower end bell in communication with the interior of said vessels at a location above the level of said foam on said body of liquid contained therein;
 a drain pipe having one end open to the under surface of the lower end bell and extending into the interior of said vessel;
 conduit means venting the uppermost end bell to the atmosphere; and,
 a means for pressurizing the vessel.

References Cited by the Examiner

UNITED STATES PATENTS

| 2,140,811 | 12/1938 | Poole | 252—361 |
| 2,265,762 | 12/1941 | McKittrick et al. | 202—39 |
| 2,300,761 | 11/1942 | Amy | 55—15 |
| 2,369,020 | 2/1945 | Clark | 55—277 |
| 2,385,522 | 9/1945 | Malott | 252—361 |
| 2,664,274 | 12/1953 | Worn et al. | 165—84 X |
| 2,948,351 | 8/1960 | Phillips et al. | 55—178 |
| 3,050,447 | 8/1962 | Olney | 202—39 |
| 3,053,031 | 9/1962 | Vedder et al. | 55—292 |
| 3,056,589 | 10/1962 | Daniel | 68—355 X |
| 3,064,619 | 11/1962 | Fortman | 116—137 |
| 3,154,465 | 10/1964 | Degnen | 55—15 |
| 3,160,138 | 12/1964 | Platzman | 116—137 |

FOREIGN PATENTS

| 107,442 | 7/1917 | Great Britain. |

OTHER REFERENCES

Sound Breaks Foam Barrier in Chemical Week 88 (18) pp. 51 and 52, May 6, 1961 TP 1 C383.

Boucher R. M. G., Ultrasonics in Processing In Chemical Engr., October 2, 1961, pp. 83–100.

REUBEN FRIEDMAN, *Primary Examiner.*